United States Patent

[11] 3,622,488

| [72] | Inventors | Ramesh Chand;<br>Manuel Shaw, both of Los Angeles, Calif. |
|---|---|---|
| [21] | Appl. No. | 758,527 |
| [22] | Filed | Sept. 9, 1968 |
| [45] | Patented | Nov. 23, 1971 |
| [73] | Assignee | Dynasciences Corporation<br>Los Angeles, Calif. |

[54] APPARATUS FOR MEASURING SULFUR DIOXIDE CONCENTRATIONS
8 Claims, 2 Drawing Figs.

[52] U.S. Cl. ..................................... 204/195, 204/1 T
[51] Int. Cl. ...................................... G01n 27/46
[50] Field of Search ........................... 204/1.1, 195

[56] References Cited
UNITED STATES PATENTS

| 310,302 | 1/1885 | Moebius | 204/83 |
|---|---|---|---|
| 2,805,191 | 9/1957 | Hersch | 204/1.1 |
| 2,844,532 | 7/1958 | White et al. | 204/195 |
| 3,071,530 | 1/1963 | Neville | 204/195 |
| 3,088,905 | 5/1963 | Glover | 204/195 |
| 3,213,004 | 10/1965 | Schmidt | 204/83 |
| 3,223,597 | 12/1965 | Hersch | 200/1.1 |
| 3,227,643 | 1/1966 | Okun et al. | 204/195 |
| 3,325,378 | 6/1967 | Greene et al. | 204/1.1 |
| 2,913,386 | 11/1959 | Clark | 204/195 |
| 3,334,623 | 8/1967 | Hillier et al. | 204/195 |

*Primary Examiner*—T. Tung
*Attorney*—Donald E. Nist

ABSTRACT: Sulfur dioxide concentrations present in a gaseous mixture are rapidly and continuously monitored by measuring the current passing between an inert metallic sensing electrode and a counter electrode which electrodes are in contact with an aqueous electrolyte solution and at which sensing electrode sulfur dioxide is electrooxidized. The sensing electrode is composed of an inert metal whereas the counter electrode is composed of an electroactive material which is capable of being electrochemically reduced when electrically interconnected with the sensing electrode in the presence of the aqueous electrolyte solution.

PATENTED NOV 23 1971  3,622,488
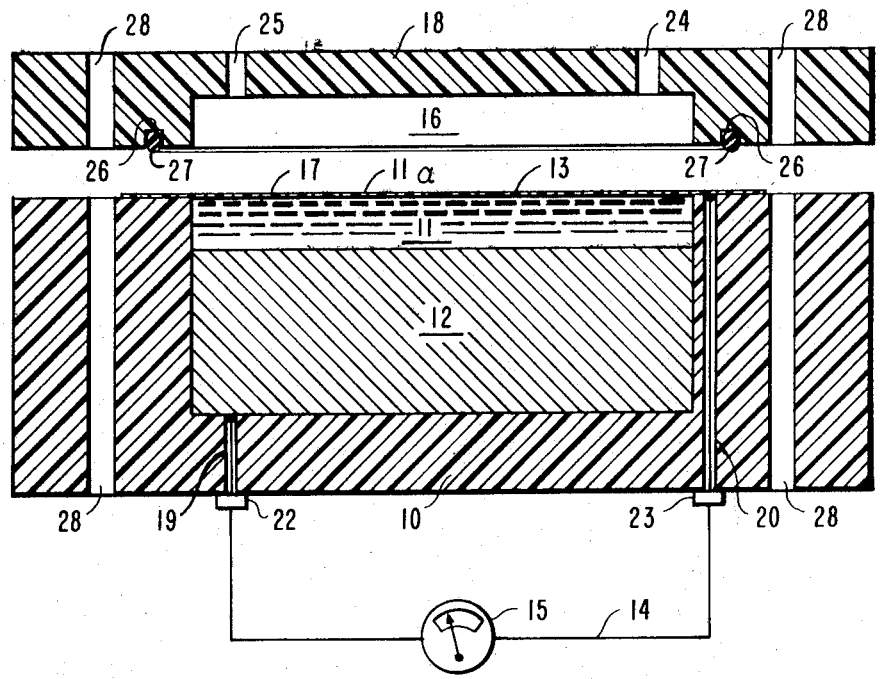
FIG.—1
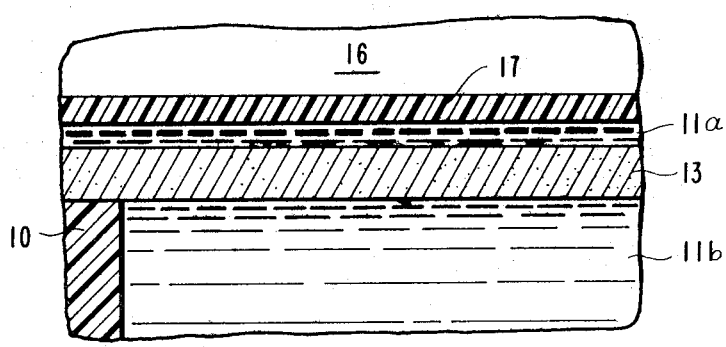
FIG.—2
INVENTORS
MANUEL SHAW
RAMESH CHAND
BY
Fraser and Bogucki
ATTORNEYS 3,622,488

APPARATUS FOR MEASURING SULFUR DIOXIDE CONCENTRATIONS

BACKGROUND OF THE INVENTION

Sulfur dioxide is a serious atmospheric pollutant. According to the U. S. Public Health Service amounts of up to about 25 millions of tons per year are expelled into the atmosphere thereby making it second only to carbon monoxide as a major source of pollutant. Sulfur dioxide is known to be extremely dangerous in view of its corrosive and poisonous characteristics. This gas causes irritation and inflammation of the conjunctiva of the eyes and also affects the upper respiratory tract and the bronchi. The inhalation of sufficient quantities of sulfur dioxide may cause edema of the lungs or glottis and may result in respiratory paralysis. In moist air or fogs the gas combines with water to form sulfurous acid which is slowly oxidized to sulfuric acid. Concentrations of less than about one part per million (p.p.m.) are believed to be injurious to plant life. While concentrations of 400–500 p.p.m. may result in fatality, amounts between about 50 and 100 p.p.m. are considered to be the maximum permissible concentration for exposures of 30 to 60 minutes. The importance of continuous monitoring of this pollutant is obvious.

Although a number of sulfur dioxide analyzers are presently available these instruments are less than satisfactory for a number of reasons. Such instruments are generally of high cost and bulkiness thereby inhibiting their widespread use and acceptance. In addition, many of these analyzers can only be operated by skilled technical personnel often requiring a number of steps in effecting the analysis as well as critical calibration procedures and handling of chemical solutions. Further, instrumental response is often slow.

The most common method of analyzing for sulfur dioxide is by colorimetric analysis which relies on absorption of the gas in a chemical reagent thereby changing its color, the change being measured photometrically. Some disadvantages include considerable maintenance, poor response the bulky apparatus. Reagent solutions must be stored and constantly pumped and samples require rigorous conditioning to remove interfering species. Response time of such instruments is of the order of 15 minutes for 90 percent response. The size and operation of the instrument is such as to discourage its use outside the laboratory.

Electrolytic and thermoconductivity analyzers, although requiring less maintenance, are highly nonspecific, and are only suited to the measurement of laboratory samples which have been conditicned to remove interfering species.

Perhaps the most suitable analyzers presently available are those utilizing photometric means in which the infrared and ultraviolet absorbance properties of sulfur dioxide are monitored. With proper filter selection, such an instrument can be made specific for sulfur dioxide. However, the size of the analyzer makes it bulky to handle thereby discouraging its use as a portable-type instrument. Further, samples must be carefully handled and continuously conditioned in order to eliminate foreign particles which settle out at the cell windows and thereby affect the sensitivity of the instrument. In addition, changes in light source intensity and detector tube sensitivity also affect the measurements thereby necessitating frequent calibration checks.

BRIEF DESCRIPTION OF THE DRAWINGS

FIG. 1 illustrates a schematic cross section of the transducer of the invention; and FIG. 2 shows an enlarged detailed view of a broken away portion of the sensing electrode area of FIG. 1.

DESCRIPTION OF THE INVENTION

It is to the elimination of the problems generally associated with the above-noted methods of analyzing for sulfur dioxide that the present invention is directed. Specifically, the apparatus of the invention for measuring sulfur dioxide concentrations present in a gaseous mixture comprises a transducer having a sensing electrode and a counterelectrode which contact an aqueous electrolyte solution. The transducer is constructed in such a manner that the sensing electrode, at which sulfur dioxide is electrooxidized, is located between the surface of the electrolyte which is in contact with the sulfur dioxide containing atmosphere and the counterelectrode. In this manner, as the gaseous mixture is diffused into the electrolyte at the gas-electrolyte interface, the sulfur dioxide molecules will contact the sensing electrode and thereupon be electrooxidized to sulfate ions. At the same time the counterelectrode, which is in contact with the electrolyte solution and interconnected with the sensing electrode so as to allow a current to flow therebetween, is electroreduced to consume the sulfate ions produced by oxidation at the sensing electrode.

Initially, the operation of the transducer of the invention will be more readily appreciated and understood by referring to the schematic representation of the device as shown in the accompanying drawings.

FIG. 1 shows a schematic cross section of a preferred construction of the transducer of the invention whereas FIG. 2 illustrates, in detail an enlarged portion of the device at the sensing electrode. Each of these drawings may be referred to in the following description. The electrolyte solution 11 is contained in a suitable vessel 10 in which is present a counterelectrode 12 and a sensing electrode 13. The vessel 10 may consist of any suitable material such as plastic, glass, etc. which is preferably impact resistant and shatterproof. A means for passing a current between the sensing and counterelectrodes comprises a conductive wire 14. The wire 14 is attached to terminals 22 and 23 located on the exterior of the vessel 10 with the terminals 22 and 23 being interconnected to the respective electrodes via conduits 19 and 20. It will be appreciated that other suitable means for electrically connecting the electrodes may be used which allows a current flow, which current is caused by electrons generated at the sensing electrode at which an electrooxidation reaction occurs. In a preferred embodiment, as shown in the drawings, the surface of the electrolyte is covered with a semipermeable membrane 17 through which a gas may diffuse but which will prevent significant losses of electrolyte by evaporation or spillage. However, in a simplified device, the membrane may be eliminated and the electrolyte surface fully exposed to a gas. As sulfur dioxide containing gas contacts the electrolyte surface, sulfur dioxide molecules will diffuse into the electrolyte with the concentration of sulfur dioxide initially entering the electrolyte solution being proportional to its concentration within the atmosphere. Thereafter, as sulfur dioxide molecules in solution in the electrolyte contact the surface of the sensing electrode 13, they become electrooxidized to produce $SO_4^{=}$ sulfate ions with the specific reaction depending on the type of electrolyte present and the material making up and the relative potential of the counterelectrode as will be more fully explained hereinafter. As the electrooxidation of sulfur dioxide occurs, a current generated between the sensing and counterelectrodes, is monitored by suitable means 15 which may include amplification equipment. Although the current will depend on the rate of diffusion of sulfur dioxide into the particular electrolyte, temperature and pressure variations, etc., it will be evident that the current in any event will be proportional to the concentration of atmospheric sulfur dioxide.

It is especially important that the sulfur dioxide present in electrolyte be essentially confined to the portion of the electrolyte 11a between the sensing electrode 13 and the electrolyte surface. Significant diffusion of sulfur dioxide beyond the sensing electrode 13 and throughout the bulk of electrolyte 11b will be prevented during transducer operation since essentially all of the sulfur dioxide molecules contacting the sensing electrode 13 will become immediately electrooxidized. Accordingly, as the sulfur dioxide concentration within the portion of electrolyte contacting the sensing electrode 13 is continually diminished, more sulfur dioxide diffuses to that portion of electrolyte and thereafter is electrooxidized. Thus, further diffusion of sulfur dioxide into the portion of electrolyte 11b between the counter and sensing electrodes is essentially prevented. It will be evident that sulfur dioxide present at the counterelectrode 12 would become directly reduced with no resulting current flowing between the counter and sensing electrodes from the reaction.

As previously noted, the vessel 10 may be open to the atmosphere or be constructed as shown in FIG. 1 whereby a cover 18 is present. Where such a cover is utilized, means for directing a gas into the sample gas space 16 such as a gas inlet 24 and outlet 25 are provided. The cover 18 may also be provided with a groove or slot 26 for seating a gasket or O-ring 27 which will complete the enclosure of the gas sample space 16 and confine the gas. The cover 18 and vessel 10 may additionally be provided with appropriate boreholes 28 through which bolts may be placed for securing the cover 18 to the vessel 10. Obviously, other means such as clamping devices and the like may also be used for this purpose. This type of construction is especially suited for directing gas streams such as furnace or industrial stack exhausts and the like to be analyzed.

It will be appreciated that the construction of the transducer disclosed herein maybe used for analysis of a number of different gases and is not limited to sulfur dioxide. Thus, for example, the device may be utilized to monitor, for example, nitrogen oxides, as disclosed in our copending application Ser. No. 758,351, filed Sept. 9, 1968, concurrently herewith by proper selection of counterelectrodes and electrolyte compositions.

The sensing electrode may consist of any noble metal which itself does not undergo electrochemical reaction within the electrolyte. Examples of suitable metals include gold, platinum, palladium, iridium and the like. The electrode itself may consist of a screen, foil, porous plaque or fabricated in such other suitable form as desired. In forming an electrode of such precious metals, as a practical manner it is often preferred to form a coating of the inert metal on relatively less expensive metallic substrate materials. Thus, for example, a sensing electrode consisting of a gold-plated copper or nickel expanded metal is found to be quite satisfactory. Further, it is preferred to fabricate this sensing electrode in a manner to expose a rather large electrode surface area to the electrolyte solution. Accordingly, fine screens or porous electrodes may be preferred.

The counterelectrode consists of an electroactive material which is capable of being electroreduced when in contact with the electrolyte. Where the transducer is to act as an electrooxidant-type sensor, i.e., where sulfur dioxide is to be electrooxidized at the sensing electrode, the counterelectrode must comprise a material which will accept the negatively charged sulfate ions being generated at the sensing electrode by the oxidizing sulfur dioxide. In turn, the counterelectrode material utilizes the electrons and itself is electroreduced attracting the sulfate ions generated by oxidation at the sensing electrode and neutralizing them by forming a sulfate salt. Various counterelectrode compositions may be used which are chemically compatible with the electrolyte and relatively insoluble therein. The specific composition of the counterelectrode will depend on how it is to be electroreduced with the specific material selected determined by the type of electrolyte and the possible presence of interfering species such as the oxides of nitrogen in the gaseous mixture to be analyzed.

The electrooxidation of diffused sulfur dioxide in an aqueous acid electrolyte solution at the sensing electrode is carried out at +0.17 v. (Stockholm Convention) relative to the standard hydrogen electrode, and which polarity is positive relative to the standard hydrogen electrode. The acid electrolyte in this electrooxidant-type sensor is preferably dilute sulfuric acid although other acids may be used. In such a system an electroactive counterelectrode composition must be one itself having a single standard reduction potential more positive than +0.17 v. at a positive polarity relative to the standard hydrogen electrode. Suitable examples include silver chloride, antimony oxide, tellurium oxide, silver sulfate, mercurous sulfate, lead dioxide, manganese dioxide or other suitable metal oxides chemically compatible with the electrolyte and which have a reduction potential greater than +0.17 v. with positive polarity relative to the standard hydrogen electrode. Where interfering species such as nitric oxide and/or nitrogen dioxide are present in the gaseous samples and which oxides will also be diffused in the aqueous electrolyte solution, the counterelectrode composition is somewhat more limited. This is true since the oxides of nitrogen electrooxidizes in acid electrolyte at reduction potentials of about +0.80 v. and greater. Thus, when analyzing for sulfur dioxide in atmospheres containing the oxides of nitrogen, the interference may be avoided by selecting counterelectrode compositions having single standard reduction potentials between +0.17 and +0.80 v. in acidic aqueous electrolytes. Mercurous sulfate, silver chloride, silver sulfate, silver chromate, silver carbonate, tellurium oxide and antimony oxide will be suitable for this purpose.

It will be evident to those skilled in the art that a number of counterelectrode compositions which will be compatible with aqueous acidic electrolyte solutions may be selected. The counterelectrode compositions disclosed herein are in no way to be considered exhaustive of those materials which may be used and are given only by way of example. However, selection of specific counterelectrode compositions must be made so that the electrooxidation of sulfur dioxide in the particular electrolyte may be accomplished with the further limitation of avoiding reactions involving interferring species such as oxides of nitrogen as set forth herein with the resulting sulfate ions being consumed in the reduction process at the counterelectrode by combining with its electroactive material to produce a chemically inactive sulfate salt or the like.

Again, as in the case of the sensing electrodes, a number of different techniques for fabricating the counterelectrode may be used. Thus, the compositions may be plated or otherwise impregnated onto inert materials in such a manner as to allow maximum exposure of the electroactive material to the electrolyte solution. Where the apparatus is to be used for relatively long periods of time it may be desirable to cover the counterelectrode with a suitable ion-exchange or ion-selective membrane which will prevent the gradual buildup of dissolved metal ions originating from the counterelectrode. The use of such a cover prevents possible changes of surface characteristics resulting from extensive buildup of ionic materials.

The gaseous mixture which is to be analyzed for sulfur dioxide according to the present invention may be exposed to the electrolyte solution in which it will be diffused by any suitable manner. Where an open vessel is used, gaseous diffusion at the electrolyte surface will readily take place by mere exposure to the sulfur dioxide containing atmosphere. Where an enclosed vessel is preferred, a space between the vessel wall and the electrolyte surface into which space gases may be directed is necessary. The gaseous mixture may then be pumped or otherwise fed into the space continuously or intermittently as desired. As previously noted, in order to prevent extensive electrolyte evaporation a semipermeable membrane of an inert material which will not prevent or substantially impede gaseous diffusion of the sulfur dioxide into the electrolyte may be used to cover the surface of the electrolyte solution. For example, Teflon polyethylene, polypropylene and the like are suitable where the particular material may be chosen for its relative impermeability to possible interfering gases. The membrane will also prevent loss of the electrolyte by spillage and will provide improved convenience since the device may be placed in any position during use or storage without significant loss of electrolyte.

Monitoring of the current passing between the sensor electrode and the counterelectrode may be accomplished by any suitable means. Although the current is directly proportional to the partial pressure of sulfur dioxide present in the atmosphere diffusing into the electrolyte solution due to the relatively low-current intensity appropriate electronic amplification will be useful. Further, equipment calibrated to read directly in parts-per-million sulfur dioxide is effective in continually monitoring the output voltage of the amplifier although other suitable means may be selected.

The following examples are given to illustrate the manner in which the invention is carried out. It is to be understood that the examples are given by way of illustration only and are not intended to limit the invention to any particular or specific materials or conditions set forth therein.

EXAMPLE I

A counterelectrode was prepared by mixing 6.8 g. of reagent grade lead dioxide, 0.8 g. polypropylene powder and 0.4 g. carbon black. Approximately 4 g. of this mixture was spread evenly in a mold 1¾ inch by 1⅜ inch by one-fourth inch deep having removable bottom and top plates. A flat piece of platinum mesh 1¾ inch by 1⅜ inch by 0.004 inch thick was placed in intimate contact with the powder and the assembly pressurized at 6000 p.s.i.g. for 5 minutes by a hydraulic press at a temperature of 150° C. Thereafter the mold was removed from the press and cooled. The sensing electrode consisted of 3-inch diameter circular plate of gold. The electrodes were commonly wired to electronic current amplification equipment and were assembled in a plexiglass container to which an aqueous solution of 1N sulfuric acid was carefully added to avoid trapped air bubbles. The gold electrode was covered with a one-fourth mil thick Teflon membrane and the entire assembly made secure. Into the air space above the membrane was continually passed an atmospheric gaseous mixture containing sulfur dioxide through an inlet tube extending from the exterior of the plexiglass container. The gas exited from the enclosure through a similar projection tube opposite the inlet tube. Diffused sulfur dioxide oxidation immediately took place at the sensor electrode with concomitant reduction of the lead dioxide counterelectrode composition. The current caused by the two simultaneous reactions was continuously monitored while the sulfur dioxide concentrations of the gaseous mixture entering the analyzer was changed. Initially, the response time of the apparatus to indicate 90 percent of the actual initial sulfur dioxide concentration of 100 p.p.m. was about 10 seconds. Thereafter the sulfur dioxide concentration was changed to 50 p.p.m. with the recovery time of the analyzer in registering the change in concentration being about 15 seconds.

EXAMPLE II

Mercurous sulfate was prepared by electrolysis of 6M sulfuric acid solution using a mercury pool anode and a platinum cathode with a current density of about 50 ma./sq. cm. The electroformed mercury sulfate was kept in suspension by gentle stirring. The product was filtered and washed several times with 1M sulfuric acid and dried under a vacuum. About 14.2 g. of the dried product was mixed with 0.8 g. polypropylene powder and 0.4 g. carbon black. About 10 g. of the mixture was used in preparing the counterelectrode which was press-molded according to the procedure described in example I.

The current collector was prepared from a silver-expanded metal. A gold sensing electrode, the counterelectrode, normal sulfuric acid, and Teflon membrane were assembled into a plexiglass container as used in example I. A sulfur dioxide containing gaseous atmosphere in which was also present nitrogen dioxide was introduced into the analyzer and monitored with results and response times being practically identical with that of the previous example. The presence of nitrogen oxide did not interfere with the sulfur dioxide analysis.

We claim:

1. A transducer for measuring the concentration of sulfur dioxide in a gaseous sample comprising:
    a confined volume of aqueous acid electrolyte having an active surface for receiving sulfur dioxide molecules from said gas sample to be dissolved in said electrolyte;
    a sensing electrode immersed in said electrolyte adjacent the active surface consisting of a chemically inert material for contacting the sulfur dioxide dissolved in said electrolyte for electrooxidation to produce sulfate ions;
    means, including a counterelectrode of a material selected from the group consisting of lead dioxide, mercurous sulfate and silver sulfate immersed in said electrolyte and spaced from said sensing electrode on the side opposite said active surface of the electrolyte, electrically coupled to said sensing electrode for maintaining said sensing electrode at a predetermined positive potential of more than 0.17 v. relative to the standard hydrogen electrode and less than approximately 0.80 v. relative to the standard hydrogen electrode at which other gases in the sample may be oxidized by said sensing electrode and for maintaining said counterelectrode at a positive potential relative to said sensing electrode; and,
    indicator means electrically coupled for measuring the amplitude of the current flow between said sensing electrode and said counterelectrode.

2. The transducer of claim 1 wherein: the surface of said sensing electrode consists of a material selected from the group consisting of gold, platinum, palladium and iridium.

3. The transducer of claim 1 wherein: said counterelectrode consists of lead dioxide.

4. The transducer of claim 1 wherein: said counterelectrode consists of mercurous sulfate.

5. The transducer of claim 1 wherein: said electrode consists of silver sulfate.

6. The transducer of claim 1 further comprising:
    membrane means for covering said active surface and confining said electrolyte consisting of a membrane material readily permeable to the diffusion of sulfur dioxide therethrough and relatively impermeable to said electrolyte.

7. The transducer of claim 6 wherein: said membrane material is selected from the group consisting of Teflon and polyethylene.

8. The transducer of claim 6 wherein: said membrane material is Teflon.

* * * * *